Oct. 3, 1950  E. M. BUTLER  2,524,511
SELF-ENERGIZING ELECTROLYTIC WATER CORRECTION ASSEMBLY
Filed Feb. 10, 1947  2 Sheets-Sheet 1
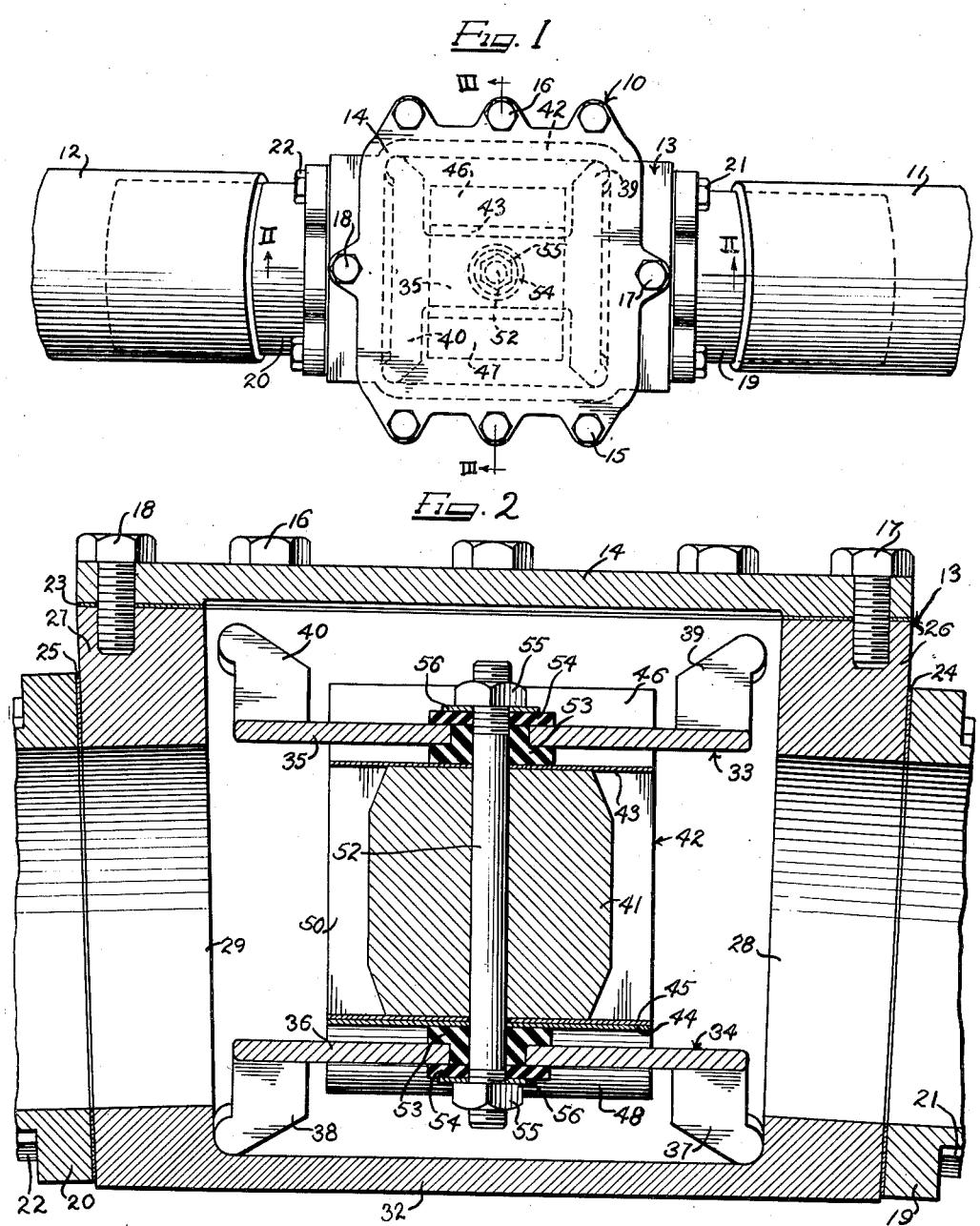
Inventor
EDGAR M. BUTLER

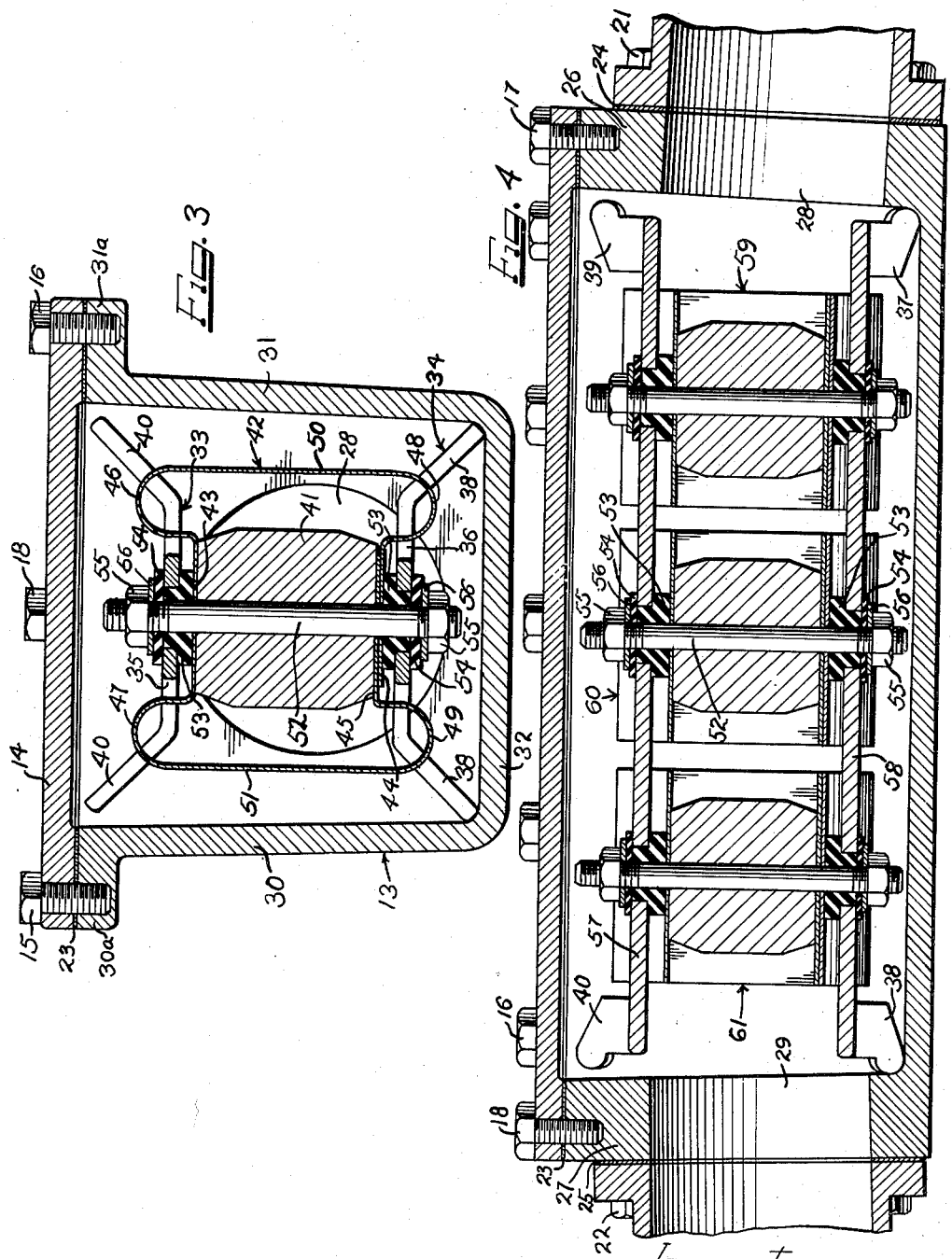

Patented Oct. 3, 1950

2,524,511

UNITED STATES PATENT OFFICE 2,524,511

SELF-ENERGIZING ELECTROLYTIC WATER CORRECTION ASSEMBLY

Edgar M. Butler, New Orleans, La.

Application February 10, 1947, Serial No. 727,536

2 Claims. (Cl. 204—248)

This invention relates to a self-energizing electrolytic water correction assembly for connection in a hot water conduit, such as a conduit in the water cooling system of an internal combustion engine.

It has long been known in the operation of internal combustion engines employing a water cooling system that scale formed on the heat transfer surfaces of the water jacket cuts down the efficiency of heat transfer from the engine to the water in the circulatory system. It has not been generally appreciated, however, that this loss of transfer efficiency has necessitated the use of a larger capacity cooling system than would otherwise be required, and, further, that there is also a concomitant loss in engine efficiency due to overheating of the engine in warm weather. Because of the hardness of much of the water used in the cooling systems of internal combustion engines, particularly those of automotive vehicles, scale not only forms on the heat exchange surfaces between the engines and the water of the cooling system but also upon the internal surfaces of the pump and of the radiator tubes. In those areas of the country where the water used has a particularly high "permanent hardness," the condition is so much aggravated that the cooling system may actually become clogged up with scale deposits from the water used.

I have found that self-energizing electrolytic water correction devices may be employed in the water cooling systems of internal combustion engines, including Diesel engines, to increase the efficiency of heat transfer between the engine and the water of the cooling system. As described in my copending applications Serial No. 710,312 (now Patent Number 2,451,868) and 717,342, filed November 16, 1946 and December 20, 1946, respectively, devices of my invention intended for such use include a positive element, which may be copper or a copper- or silver-plated foundation metal, or other metal low in the electromotive series of metals, and a negative element, which is preferably a metal selected from the group consisting of zinc, aluminum and magnesium. In accordance with well known electrochemical principles, a device such as described acts as a galvanic couple when immersed in an aqueous electrolyte, the negative element being electrolytically dispersed into the water to produce metallic ions that immediately combine with the water to give hydrated metallic ions. These metallic ions react with hydroxyl ions to yield insoluble metallic hydroxides. Either the metal ions themselves or the insoluble metallic hydroxides that are formed react with or in some way entrain the calcium and magnesium ions present in the water that are responsible for its hardness. The result is that a soft sludge is formed rather than the usual hard, adherent scale of lime that builds up on heat transfer surfaces in the case of untreated "hard" water.

In addition to preventing scale formation, the use of my self-energizing electrolytic water correction devices in the cooling systems of internal combustion engines tends to break up any scale already formed. As a result of the removal of calcium and magnesium ions from the water, the water in contact with any scale already formed is almost free of these ions, and hence has the capacity for dissolving the salt that composes the scale. This action may not be entirely due to complete dissolution of the scale but may be due to the fact that the scale deposit usually comprises two or more salts that differ considerably in solubility, so that the dissolution of the more soluble salts weakens the scale structure sufficiently to cause the scale to fall away from the heat transfer surfaces of its own accord.

My self-energizing electrolytic devices have the further effect of preventing oxygen corrosion, in that oxygen is removed from the water by electrolytic reduction and reaction with the metallic ions produced as a result of the electrolytic action of the galvanic couple. The result is that the surfaces of the cast iron water jacket of the engine remain relatively free of oxides and are, therefore, more efficient in their transfer of heat from the engine to the water of the cooling system.

In accordance with the principles of my present invention, I provide an electrolytic water correction assembly for connection in a conduit through which hot water from the water circulatory system of an internal combustion engine, such as a Diesel engine, flows on its way to a radiator or other heat exchange medium. The assembly includes an elongated casing adapted to be connected in the conduit and having removably disposed therein an electrolytic water correction unit comprising one or more galvanic couples which traverse the flow of water through the casing. For easy removal of the unit the casing has an open top adapted to be closed by means of a cover plate. In one form of my invention, the electrolytic water correction device comprises an angular surfaced mass forming the negative element and a sheet-like positive element in contact with the ends of the negative element and extending in spaced relation to the lateral surfaces of the negative element. The two elements are mounted between elongated platforms having legs extending outwardly from the ends thereof for positioning the couples within the casing. The positive element has preferably a broad longitudinal surface so that the galvanic action can be developed to the greatest extent. On the other hand, the positive element may be as thin as desired so as not to reduce the flow of water around the device. The chamber is preferably of sufficiently large cross-sectional area as compared with the cross-sectional area of the conduit in which the casing is inserted for the same reason. The inner side walls of the casing may be cast with a slight upward and outward slope so that the lower mounting legs fit in easily at the top of the casing and may be wedged into the bottom corners thereof. According to my invention, the electrolytic water correction assembly may be made any desired size and contain any number of electrolytic water correction couples depending on the amount and condition of the water to be corrected.

It is, therefore, an important object of this invention to provide an electrolytic water correction assembly for insertion in a hot water conduit, the construction and arrangement being such as to insure effective treatment of the water while not materially reducing the volume and flow through the conduit.

It is a further object of this invention to provide an electrolytic water correction assembly in which one or a plurality of galvanic couples can be easily installed as a unit and as easily removed without disconnecting the entire assembly from the conduit in which it may be inserted.

A still further object of this invention is to provide an electrolytic water correction assembly for insertion in a hot water conduit, including an elongated casing having an open top closed by a removable cover plate and having galvanic couples carried by elongated mounting platforms with outwardly extending legs for removable positioning and support in the casing.

Other and further important objects of this invention will be apparent from the disclosures in the specification and the accompanying drawings.

On the drawings:

Figure 1 is a plan view of an electrolytic water correction assembly installed in place in a conduit;

Figure 2 is an enlarged sectional view taken substantially along the line II—II of Figure 1 with parts thereof in elevation;

Figure 3 is an enlarged sectional view taken substantially along the line III—III of Figure 1 with parts thereof in elevation, and Figure 4 is a view similar to Figure 2 of a modified form of my invention.

On the drawings:

The reference numeral 10 indicates generally a self-energizing electrolytic water correction assembly embodying the principles of my invention. As illustrated in Figure 1, the device 10 is connected in a conduit, the ends of which are indicated by the reference numerals 11 and 12, and which may be a conduit in a water circulatory system of an internal combustion engine, as a Diesel engine. Said assembly 10 includes an elongated casing 13 open at the top, and a removable cover plate 14 attachable to the top of the casing by means of bolts 15 and 16 on the sides and bolts 17 and 18 at the ends. Said conduit ends 11 and 12 fit snugly over flanged nipples 19 and 20, respectively which are in turn connected to the casing 13 by means of bolts 21 and 22.

In order to provide a watertight joint between the casing and the cover plate, a gasket 23 is provided (Figure 2). A seal is also afforded between the abutting ends of the casing and the flanged ends of the nipples 19 and 20 by means of the gaskets 24 and 25.

The body of the casing 13 is provided with thickened end walls 26 and 27 having slightly upwardly inclined bores 28 and 29 formed therein for flow communication with the conduit. Likewise side walls 30 and 31 slope slightly outwardly as they extend upwarlly from the bottom 32 of the casing (Figure 3). The consequent upward slope of nipples 19 and 20 attached to the end walls 26 and 27 tends to enhance the turbulence of the inflowing water. The side walls have flange projections 30a and 31a for receiving the cover plate bolts 15 and 16.

A self-energizing electrolytic water correction unit or galvanic couple is held within the body of the casing by means of upper and lower mountings 33 and 34. Said mountings comprise flat horizontal platforms 35 and 36 carrying at each end outwardly extending pairs of legs, the lower pairs of legs 37 and 38 wedging snugly into the lower corners of the casing and the upper legs 39 and 40 extending generally upwardly and toward the upper corners of said casing. The negative electrode or element 41 of the galvanic couple, which may be a solid mass of zinc, magnesium or aluminum, is generally of square cross-section, and is slightly tapered toward its ends. In contact with said ends, which are plane, is a thin sheet-like positive electrode or element 42, which may be formed of copper or a copper- or silver-plated foundation metal. Said positive electrode extends in spaced relation to the lateral surfaces of the negative core.

Referring to Figure 3, it will be seen that the positive element has a central portion 43 which extends across the plane surface at the upper end of the negative core. The lower end portions 44 and 45 overlap on the bottom plane surface of the negative core. Extending upwardly from each side of the top portion 43 of the positive element are semi-circular portions 46 and 47. Similar semi-circular portions 48 and 49 extend downwardly from the overlapping end portions 44 and 45 and then upwardly to be joined to the outer ends of the upper semicircular portions 46 and 47 by flat vertical portions 50 and 51. As can be seen in Figure 2, the positive element has a longitudinally extending surface which is somewhat broader than the longitudinal surfaces of the negative core.

Thus as illustrated in Figure 3, the side edges of the positive element are presented to the flow of water so as not materially to reduce the volume of flow of water by reason of the positioning of the electrolytic water correction device in such flow. With the same objective in mind, the casing is of sufficiently large cross-sectional area as compared with the cross-sectional area of the conduit. The positive element has a broad longitudinal surface so that the galvanic action can be developed to the greatest extent.

Referring to Figure 3, it will be seen that cylindrical holes are drilled in the negative core and in the positive electrode for receiving a mounting stud 52. The holes in the positive electrode are drilled in the overlapping end portions 44 and 45 at the bottom and in the central portion 43 at the top. The upper and lower mountings have holes of slightly larger diameter for receiving fabric washers 53 insulating the mountings from the stud 52. The washers 53 have inner annular flanges for separating the positive electrode from the mountings. Each end of the stud is threaded and receives an outer fabric washer 54 serving to insulate the nut 55 threaded thereon and the metallic washers 56 from the mounting. Thus, direct electrical contact between the walls of the casing and the galvanic couples through the mountings is avoided.

In Figure 4 is shown a modification of my invention in which a plurality of galvanic couples is used. It will be evident from inspection that this construction is identical with that of Figure 2 except that the casing has been extended to receive elongated mountings 57 and 58 carrying a plurality of galvanic couples such as 59, 60 and 61.

Thus, any number of galvanic couples may be readily installed depending on the condition of the water and the rate of flow.

It should be noted that the mounting legs and platform portions will create a swirl of water around the galvanic couple or couples, rendering their action more effective. The nuts 55 serve to increase this effect.

Both the stud 52 and nuts 55 may, if desired, be formed of a positive element, or surfaced therewith, so as to provide with the negative element 41 a galvanic couple.

In my invention the electrodes of each galvanic couple preferably extend transversely of the flow of water through the casing and the galvanic couples are spaced longitudinally of the flow of water so that the galvanic action can be developed to the greatest extent. The galvanic couples, furthermore, are removable upon removal of the cover plate, without the necessity of disconnecting the casing from the conduit in which it may be inserted.

It will, of course, be understood that various details of construction may be varied through a wide range without departing from the principles of this invention and it is, therefore, not the purpose to limit the patent granted otherwise than necessitated by the scope of the appended claims.

I claim as my invention:

1. An electrolytic water correction assembly comprising an elongated casing for the flow of water therethrough having an open side, a closed bottom and flat upwardly and outwardly sloping side walls cooperating with the bottom to form lower corners, a readily removable cover plate normally closing said open side, a galvanic couple for insertion into said casing through said open side, mounting means for said galvanic couple including a platform extending longitudinally of said casing for carrying said galvanic couple and outwardly extending legs secured to said platform for wedging engagement with said lower corners to maintain said platform and said galvanic couple carried thereby in position within said casing, and insulating means interposed between said couple and said mounting means, said couple and said mounting means being removable from said casing as a unit through said open side.

2. An electrolytic water correction assembly comprising a casing for the flow of water therethrough having a bottom and flat upwardly and outwardly sloping side walls cooperating with the bottom to form lower corners, a mounting platform having outwardly extending legs for wedging engagement with said lower corners to maintain said platform in position within said casing, a galvanic couple including a negative element core and a thin sheet-like positive element in extended surface engagement with the ends of said core and extending in spaced relation between the side surface of said core and said casing side walls, and means securing said galvanic couple to said platform to maintain said negative and positive elements in assembled relationship within the casing.

EDGAR M. BUTLER.

REFERENCES CITED

The following references are of record in the file of this patent:

UNITED STATES PATENTS

| Number | Name | Date |
| --- | --- | --- |
| 438,579 | Faunce et al. | Oct. 14, 1890 |
| 525,303 | Woods | Aug. 28, 1894 |
| 540,608 | Collier et al. | June 14, 1895 |
| 1,697,622 | Waples | Jan. 1, 1929 |
| 2,348,882 | Butler | May 16, 1944 |